United States Patent Office 3,517,339
Patented June 23, 1970

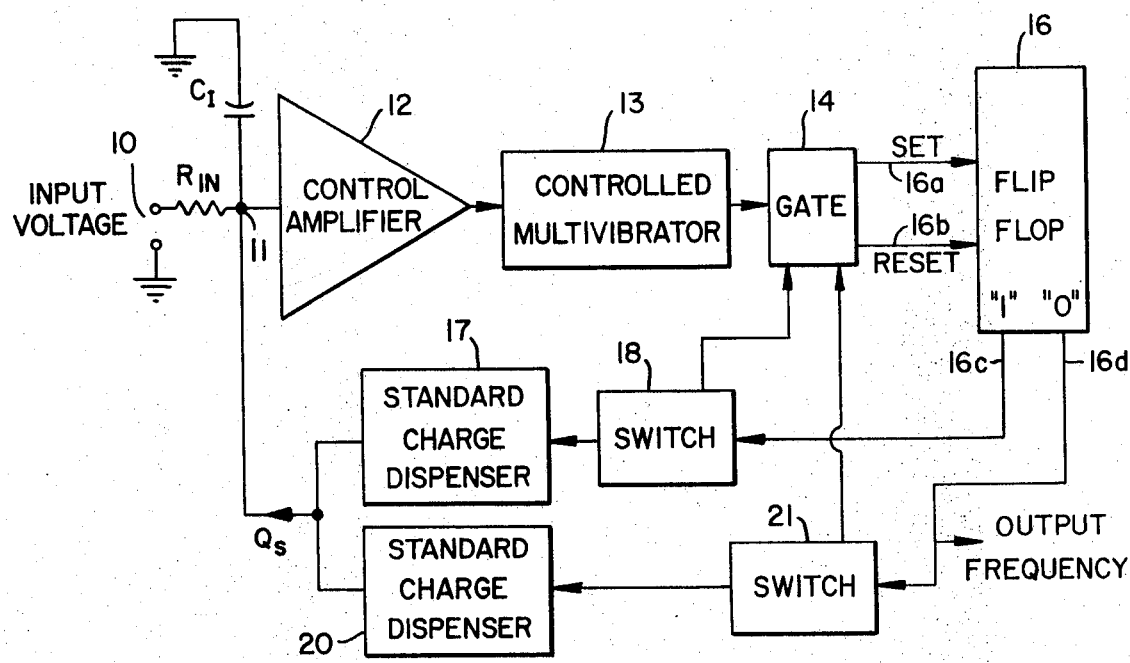
FIG_1
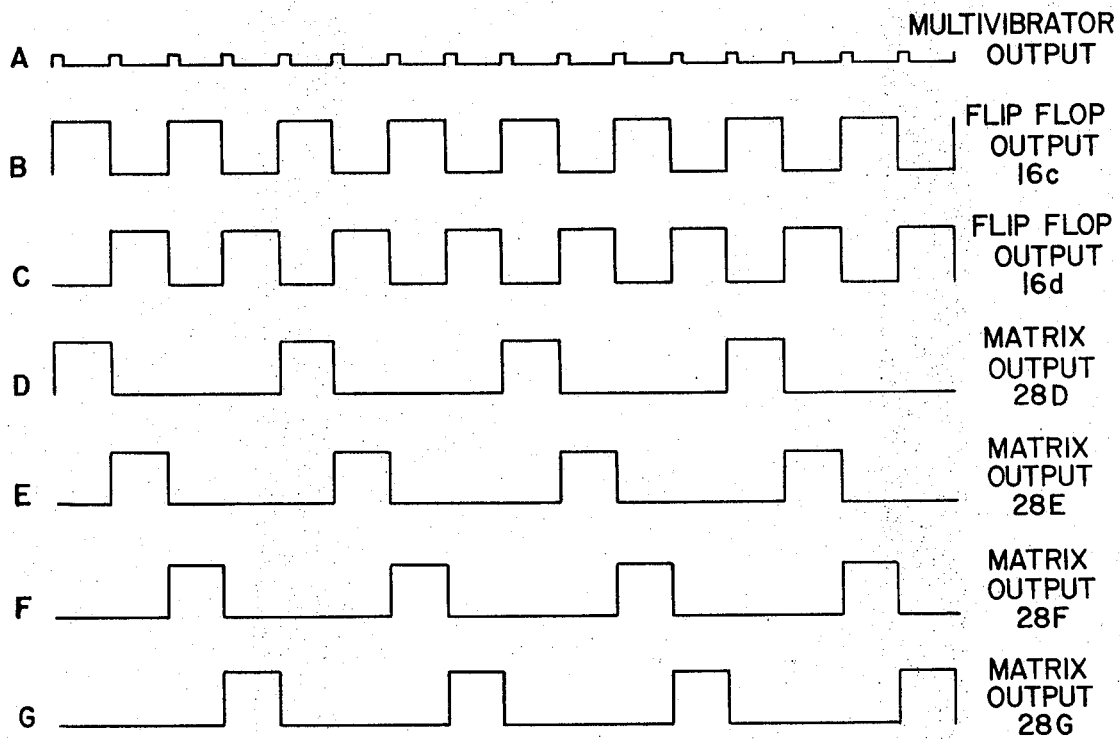
FIG_3

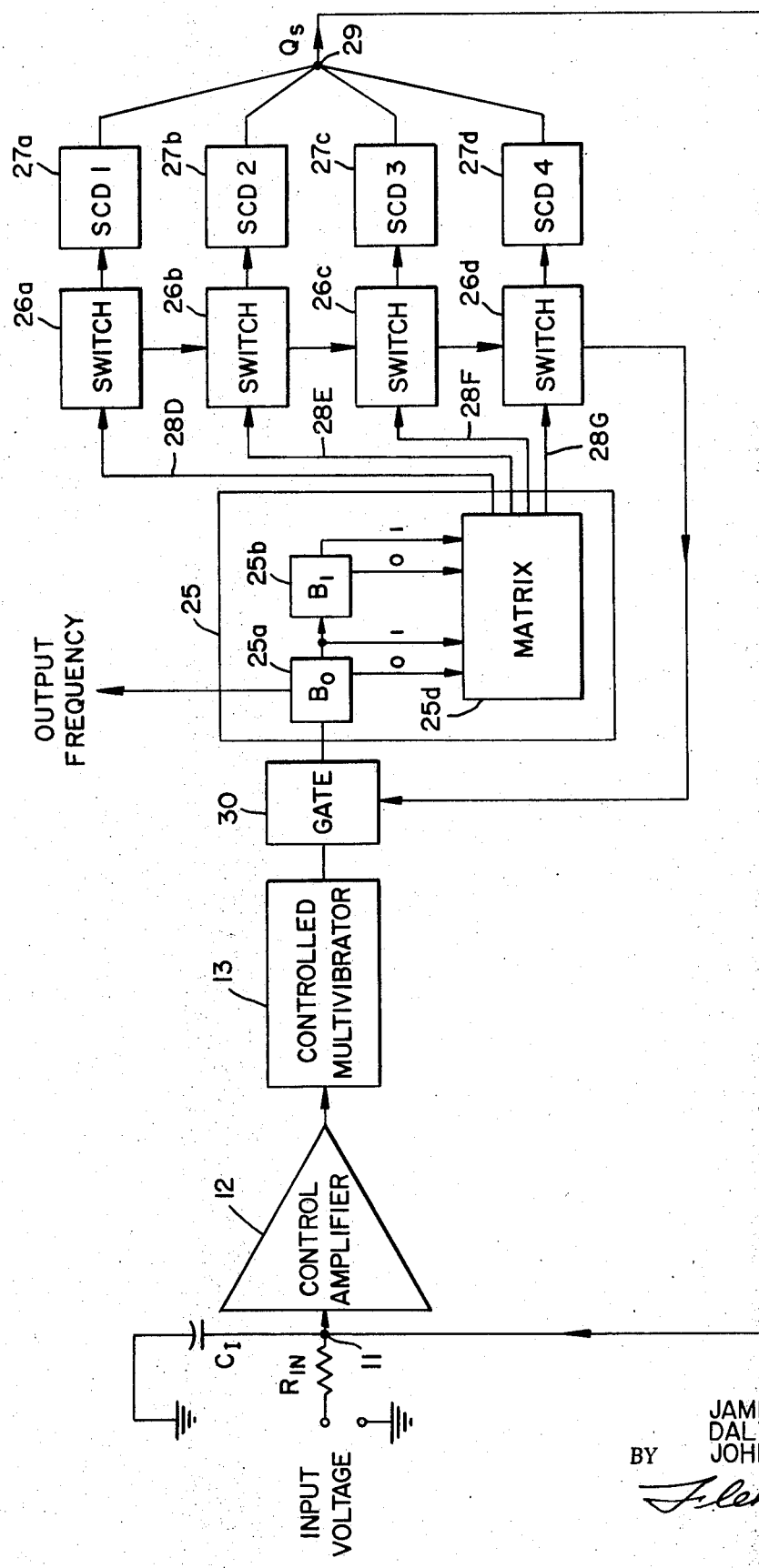
FIG_2

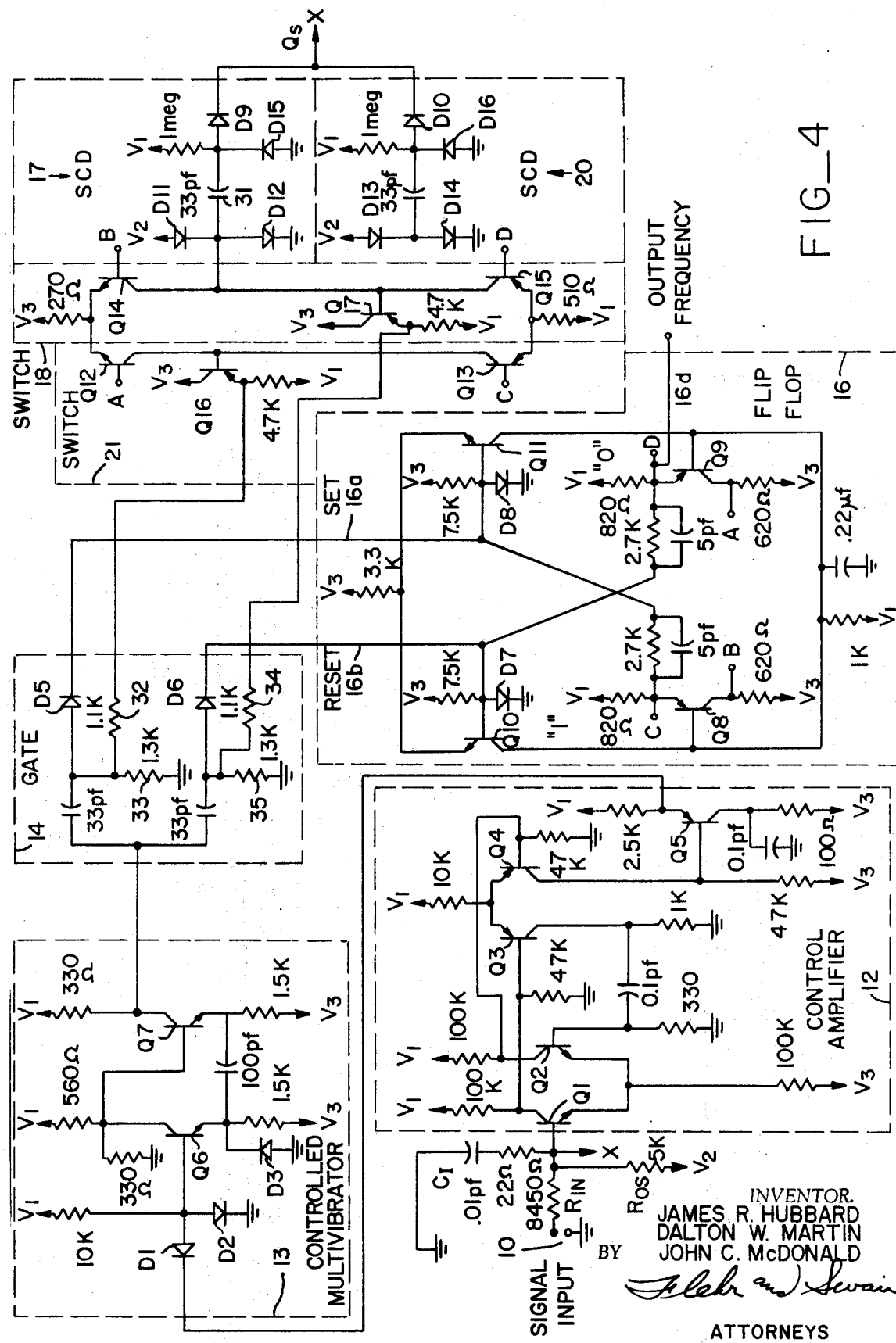
FIG_4

3,517,339
VOLTAGE TO FREQUENCY CONVERTER HAVING SYMMETRICAL WAVESHAPE OUTPUT WITH FUNDAMENTAL FREQUENCY PROPORTIONAL TO INPUT SIGNAL
James R. Hubbard, Mountain View, Dalton W. Martin, Palo Alto, and John C. McDonald, Los Altos, Calif., assignors to Vidar Corporation, Mountain View, Calif., a corporation of California
Filed Mar. 21, 1966, Ser. No. 535,888
Int. Cl. H03k 7/00, 3/281; H02m 5/30
U.S. Cl. 332—14                                6 Claims

ABSTRACT OF THE DISCLOSURE

A voltage to frequency converter having a symmetrical waveshape output proportional in frequency to the input voltage. The above is produced by use of a flip-flop or multistable means which drive standard charge dispensors coupled to an integrating capacitor. The flip-flop in turn is driven by a controlled multivibrator having a periodically varying voltage with a frequency proportional to the magnitude of the input signal on the integrating capacitor.

---

The present invention is directed to a voltage to frequency converter.

In many applications, it is desirable to have signal information in the form of frequency rather than voltage. For example, if it is desired to magnetically record a direct current signal, it should preferably be in the form of frequency. Such a converter is disclosed in Pat. No. 3,022,469, entitled, "Voltage to Frequency Converter," issued to G. S. Bahrs et al., and assigned to the present assignee.

The conversion of signal intelligence from voltage to frequency is especially useful in telemetering applications where information is first stored on a magnetic tape, and thereafter sent from a remote point to a home receiving station; e.g., from a satellite to an earth receiving station. With the growing need for transmission of greater amounts of information, the frequencies at which the telemetering systems operate are being rapidly increased to higher values which, in accordance with information theory, allows the transmission of a larger amount of information; frequencies of 8 megacycles are now becoming commonplace.

The higher frequencies and wider bandwidths being utilized in telemetering therefore require voltage to frequency converters which have a capability of converting to these higher frequencies.

Briefly, prior art voltage to frequency converters have employed the input signal, which is a voltage magnitude conveying certain data, to allow a predetermined charge to be placed on a capacitor. The capacitor is then discharged. The frequency of charge and discharge is dependent upon the magnitude of the input signal. As the input signal increases in magnitude, the frequency increases. The discharge of the capacitor may be controlled by the firing of a voltage sensitive device as, for example, a neon lamp, or as disclosed in the above Bahrs' patent by a "standard charge dispenser."

In providing a frequency to voltage converter operating at higher frequencies, two problems arise. First, the converter itself and its components have certain frequency limitations which when exceeded cause nonlinearities in operation or a total breakdown of operation. Secondly and most important is the requirement that the output signal be symmetrical, such as a square wave or sine wave. A wave having symmetry, in accordance with Fourier analysis, produces a weak second harmonic component and the frequency response capability of the telemetering system is maximized.

In the past, converters have utilized external bistable "flip-flop" circuits to convert the normally sharp output pulses of a converter to a symmetrical wave shape. This method, however, aggravates the frequency limitation problem since the output frequency of the "flip-flop" circuit is one-half the operating frequency of the converter. Thus, all of the circuits of the converter must be designed to operate at a frequency which is double the final output frequency.

It is a general object of the present invention to provide an improved voltage to frequency converter.

It is another object of the present invention to provide a voltage to frequency converter having an improved frequency response.

It is still another object of the invention to provide a converter of the above type which produces an output having a symmetrical wave shape.

It is still another object of the invention to provide a converter having the above advantages which is economical and efficient.

These and other objects of the invention will become more clearly apparent from the following description when taken in conjunction with the accompanying drawings.

Referring to the drawings:

FIG. 1 is a schematic diagram of a voltage to frequency converter constructed in accordance with the present invention;

FIG. 2 is a schematic diagram of an alternative embodiment of the voltage to frequency converter of the present invention;

FIGS. 3A–G illustrate waveforms at various points in the circuits illustrated in the drawings; and FIG. 4 is a detailed circuit schematic of FIG. 1.

Referring to FIG. 1, an input signal is applied to terminals 10 and charges the integrating capacitor $C_I$ through a series resistor $R_{in}$. Integrating capacitor $C_I$ operates with substantially zero volts across it so that the current flowing into the capacitor from the source is controlled by the amount of input voltage divided by the resistance of $R_{in}$. The charging current flowing into the integrating capacitor $C_I$ also varies the voltage at node 11.

Node 11 is coupled to the input of a high gain amplifier 12 which presents a high impedance to capacitor $C_I$ and amplifies the voltage appearing on the capacitor. The amplifier voltage is applied to a multivibrator 13. The circuit as thus far described is similar to that disclosed in the above mentioned Bahrs' patent.

Multivibrator 13 develops a control pulse when ever the applied voltage reaches a predetermined level, for example, zero. If the voltage is held at or above zero volts, the multivibrator continuously puts out pulses at a relatively high frequency. This frequency is proportional to the magnitude of the input signal. Under overload or starting conditions, the multivibrator oscillates at its natural frequency which ensures proper recovery and return to normal operation. In normal operation, the voltage is above zero for only a short time and the circuit's natural periodic oscillation is suppressed after one pulse is emitted. Such a pulse train is illustrated in FIG. 3A. As shown there, the pulses are of relatively short duration in comparison to the overall length of the pulse period.

Coupled to multivibrator 13 and responsive to its pulse output is a gate 14 which serves as a steering device for alternately switching pulses to a bistable flip-flop circuits 16 having set and reset inputs 16a and 16b, and "one" and "zero" outputs 16c and 16d. Coupled to each of the outputs 16c and 16d are respectively a standard charge dispenser 17 and a series connected switch 18, in the case of output 16c, and a standard charge dispenser 20 and a switch 21 in the case of output 16d. The standard charge dispensers 17 and 20, in conjunction with their associated switches 18 and 21, are responsive to the output of flip-flop circuits 16 to alternately draw from the integrating capacitor $C_1$ a predetermined amount of electrical charge, $Q_S$, each time the bistable flip-flop circuit 16 switches.

Switches 18 and 21 are also coupled to gate 14, and provide a feedback of information as to the discharge of integrating capacitor $C_i$ for assuring completion of the withdrawal of electrical energy. Thus, any spurious pulses from controlled multivibrator 13 do not prevent complete discharge at $C_i$.

In operation, the voltage to frequency converter of FIG. 1 functions at a frequency to maintain the voltage at node 11 across integrating capacitor $C_i$ very near zero. Moreover, the greater the magnitude of the input voltage, the greater number of standard charges. $Q_S$. which must be dispensed by standard charge dispensers 17 and 20 and thus the higher the frequency of the output of multivibrator 13. However, in accordance with the invention, the output frequency of the converter and the operating frequencies of the standard charge dispensers 17 and 20 are both one-half of the frequency of multivibrator 13.

As illustrated in FIGS. 3B and 3C, the output from flip-flop circuit 16 on outputs 16c and d, respectively, are symmetrical wave shapes which have a frequency which is one half that of the pulse frequency as illustrated in FIG. 3A. Thus, the frequency capabilities of the standard charge dispensers 17 and 20 and their associated switches 18 and 21 must be designed to accommodate only this half frequency. Moreover, since each standard charge dispenser and associated switch is actuated only one-half of the total charging time, the duty cycle of the dispenser is lowered which yields improved linearity and temperature stability at a given frequency. This in essence means that the frequency to voltage converter of the present invention may, because of its higher output frequency capabilities, accommodate a greater amount of input information. At the same time, the output signal of either of the output terminals 16c or 16d is a symmetrical wave which, as mentioned previously, is ideal for telemetering systems because of its strong fundamental frequency and low second harmonic.

The voltage to frequency converter as disclosed in FIG. 1 operates as a base band converter where there is a zero output frequency for a zero input voltage. However, when modified, it can operate as an offset converter. In the latter mode, the input voltage consists of a direct current offset voltage and a signal voltage. In this case, the converter produces an output frequency for zero signal voltage. The frequency then changes linearly with the applied signal voltage. In this mode, the voltage to frequency converter functions as a frequency modulated oscillator with the applied signal voltage causing the modulation. The input offset direct current voltage is normally applied through a separate resistor connected to node 11 (see $R_{os}$ of FIG. 4) and the signal voltage is applied at terminals 10.

Although in the preferred embodiment of FIG. 1 a bistable flip-flop circuit 16 is illustrated, the concept of the invention may also be utilize for even further increasing the frequency capability of the voltage to frequency converter.

As shown in FIG. 2, the circuit of FIG. 1 is modified by replacing the bistable flip-flop 16 with multistable means 25 having four stable states and having coupled to it serially connected switches 26a–d and respective charge dispensers 27a–d. Multistable means 25 is responsive to the pulse output of controlled multivibrator 13 which is fed to the first of two binary or flip-flop circuits 25a and 25b, which are connected in series. The two binary circuits function as a standard binary divider chain which counts from 1 to 4 to successively apply an actuating pulse to switches 26a–d. In accordance with this obective, the outputs of each counter 26a and 25b are coupled to a matrix 25d which is responsive to the binary outputs of each binary unit to produce a signal output on each of its output lines 28D–G which corresponds to the similarly designated wave shape of FIGS. 3D–3G. It is apparent by inspection of the wave shapes with the controlled multivibrator output pulses, FIG. 3A, that the standard charge dispensers 27a–27d and their associated switches 26 which are actuated by pulses on outputs 28D–28G operate at a frequency which is one-fourth that of the multivibrator frequency. This drastically lowers the duty cycle of the charge dispensers, enhancing their linearity and temperature stability at a given frequency. It is apparent that the number of charge dispensers may be increased almost indefinitely to further enhance the frequency capability of the converter.

The standard charge, $Q_S$, is produced at the node 29 to which the outputs of standard charge dispensers 27a–27d are joined, which charge serves to discharge integrating capacitor $C_I$ in the same manner as described in reference to FIG. 1. The output frequency which is indicative of and proportional to the magnitude of the input signal voltage is obtained from the first binary device 25a since this device has an output signal similar to that illustrated in FIGS. 3B and 3C. It is, of course, a symmetrical output wave shape having, therefore, a strong fundamental frequency and weak second harmonic.

Gate means 30 are coupled and responsive to switches 26a–26d to cause matrix 25d to cancel any spurious pulses from multivibrator 13 during the charge dispensing period.

FIG. 4 illustrates the circuit of FIG. 1 in detailed circuit schematic form, the various components of FIG. 1 being illustrated by the blocks in dashed outline which have been given corresponding reference numbers.

The three-stage control amplifier 12 includes transistors Q1–Q5 which are supplied by proper bias voltages $V_1$, $V_2$, and $V_3$, as indicated. Controlled multivibrator 13 which is responsive to the output of amplifier 12 above a certain level includes transistors Q6 and Q7 and diodes D1, D2, and D3.

The pulse output of multivibrator 13 is fed to gate or pulse-steering circuit 14 which includes diodes D5 and D6 respectively coupled to set terminal 16a and reset terminal 16b of the bistable flip-flop circuit 16. In accordance with well known multivibrator theory, the diode-steering circuit allows the flip-flop circuit to be triggered to its two stable states repeatedly with input pulses of the same polarity. Switching order is maintained by the steering diodes directing the input pulses to the proper transistor only and avoiding simultaneous application to both the "on" and "off" transistors.

Flip-flop circuit 16 includes transistors Q10 and Q11 which are coupled as indicated to form the basic components of a conventional bistable multivibrator and, in addition, includes further transistors Q8 and Q9 and diodes D7 and D8 which provide input control of the conducting state of the circuit. Each side of the flip-flop circuit has a pair of outputs, on one side labeled B and C, and on the other side, A and D. The D output yields the final output frequency of the device as explained above. These are coupled to the correspondingly lettered base inputs on switch 21 and switch 18.

Switch 21 includes complementary transistors Q12 and Q13 and switch 18 includes complementary transistors Q14 and Q15. Each individual switch functions as a charging circuit for its accompanying standard charge dispenser circiuts 17 and 20. The dispensers are joined together on conductor "X" which is connected to $C_I$ as illustrated. The input signal voltage is applied at $R_{in}$ while the above mentioned offset voltage is applied at $R_{os}$. In this embodiment $V_2$ is used as an offset voltage.

In operation, and referring for illustration to switch 18 and dispenser circuit 17, the transistor Q14 when actuated by flip-flop 16, charges a precision capacitor 31 during the transistor's on condition; this same capacitor is discharged by transistor Q15 during its on condition. In accordance with the same theory as in the above mentioned Bahrs application, during the discharge cycle the discharge current flows through the series connected diode D9 and forms the standard charge, $Q_S$, which is dispensed from the circuit.

Since transistors Q14, Q15 of switch 18, and Q12, and Q13 of switch 21 are connected in the complementary mode, when one is off, the other is on. This condition is not changed until the flip-flop is actuated to supply appropriate voltages to the letter terminals A–D. Thus in operation, while one standard charge dispenser is discharging its precision capacitor to draw a standard charge $Q_S$ from the integrating capacitor $C_I$, the other charge dispenser precision capacitor is being charged from voltage supply $V_1$.

Further means are provided by an interconnection between the switch circiuts 18 and 21 and gate 14 to prevent application of a pulse from multivibrator 13 to flip-flop 16 during the period in which dispensers 17 or 20 are dispensing a standard charge $Q_S$ to the intergrating capacitor. Thus, there are provided, in association with each switch, transistors Q16 and Q17 which have their base connected to the common collectors of transistors Q12, 13, and Q14, 15, respectively. During the on condition of these transistors as determined by switch circuits, a bias is provided through the series resistors 32 and 33 which are connected between the emitter of transistor Q16 and diode D5, and series resistors 34 and 35 which are connected between the emitter of Q17 and D6. These resistors alternately back bias diodes D5 and D6 to prevent any spurious multivibrator pulse from actuating the flip-flop circuit 16.

As mentioned previously, due to the circuit time delay between the standard charge dispenser output and the multivibrator input, the multivibrator may continue to receive an indication of a voltage above its triggering level from the integratign circuit before the charge has been fully dispensed to the integrating capacitor. Such a spurious pulse is prevented from actuating the flip-flop by the above means.

The circuit of FIG. 4 was constructed and the values of resistors and capacitors are indicated on the drawing. The following table gives the type designation of the components operating voltages, and the operating characteristics of the circuit:

Voltages:
    $V_1$—+18 volts
    $V_1$—+18 volts
    $V_2$——18 volts
    $V_3$——25 volts
Diodes:
    D1–D6—IN3605
Transistors:
    Q1,2—SP90071
    Q3–5—2N2048
    Q6,7—2N3646
    Q8,9,13,15,16,17—2N3134
    Q10,11—2N3563
    Q12,12—2N3642
Operating Characteristics:
    Center frequency—2.93 mc.
    Deviation—±1 mc.
    Signal voltage to give full deviation—±10 v.
    Best straight line linearity—±0.19% of $2x$ deviation Thus, in summary, the present invention provides a voltage to frequency converter which produces an output with a symmetrical wave shape and has improved high frequency response.

We claim:

1. A voltage to frequency converter comprising: an integrating network connected to receive an input signal;
    means coupled to said integrating network for producing a periodically varying voltage having a frequency proportional to the magnitude of said input signal;
    multistable means coupled to said last mentioned means and responsive to successive cycles of said varying voltage for successively changing from one stable state to another; and
    a plurality of charge dispensing means coupled to said multistable means and said integrating network, said dispensing means being successively responsive to each of said changes in stable states to draw from said integrating network a predetermined amount of electrical energy.

2. A voltage to frequency converter as in claim 1 in which said multistable means is a flip-flop circuit which produces a periodic output signal having a symmetrical waveshape and a fundamental frequency proportional to said magnitude of said input signal.

3. A voltage to frequency converter comprising: an integrating network connected to receive an input signal;
    pulse generating means coupled to said integrating network and responsive to the voltage on said network for forming pulses when the voltage on said network reaches a predetermined voltage level, the frequency of said pulses being proportional to the magnitude of said input signal;
    multistable means coupled to said pulse generating means, and responsive to successive pulses for successively changing from one stable state to another;
    a plurality of charge dispensing means coupled to said multistable means and said integrating network, said dispensing means being successively responsive to each of said changes in stable states to draw from said integrating network a predetermined amount of electrical energy; and
    output signal means coupled to said multistable means and producing a periodic output signal having a symmetrical waveshape and a fundamental frequency proportional to said magnitude of said input signal.

4. A voltage to frequency converter comprising: an integrating network connected to receive an input signal;
    pulse generating means coupled to said integrating network and responsive to the voltage in said network for forming pulses when the voltage on said network reaches a predetermined voltage level, the frequency of said pulses being proportional to the magnitude of said input signal;
    multistable means coupled to said pulse generating means, and responsive to successive pulses for successively changing from one stable state to another;
    steering means interposed between said pulse generating means and said multistable means for controlling the application of pulses to said multistable means;
    a plurality of charge dispensing means coupled to said multistable means and said integrating network, such dispensing means being successively responsive to each of said changes in stable states to draw from said integrating network a predetermined amount of electrical energy;
    means for assuring completion of said withdrawal of electrical energy regardless of changes in voltage of said integrating network subsequent to the start of said withdrawal; and
    output signals means coupled to said multistable means and producing a periodic output signal having a symmetrical waveshape and a fundamental frequency proportional to said magnitude of said input signal.

5. A voltage to frequency converter comprising: an integrating network connected to receive an input signal;

means for amplifying voltages on said integrating network;

a controlled multivibrator coupled to said amplifier and responsive to the output voltage level of the amplifier to form output pulses, the frequency of said output pulses being proportional to the magnitude of said input signal;

bistable means having two input terminals coupled to said multivibrator and responsive to successive pulses for successively changing from one stable state to another;

steering means interposed between said multivibrator and bistable means for alternately switching pulses from said multivibrator between said two input terminals of said bistable means;

two charge dispensing means coupled to said bistable means and to said integrating network and responsive to said alternation of said stable states to draw alternately from said integrating network a predetermined amount of electrical energy;

means coupling said charge dispensing means and said steering means for preventing switching of said bistable means until the completion of the withdrawal of electrical energy from said integrating network; and output signal means coupled to said bistable means and producing a periodic output signal having a symmetrical waveshape and a fundamental frequency proportional to said magnitude of said input signal.

6. A voltage to frequency converter as in claim 3 where said multistable means comprises a binary divider chain coupled to a matrix having a predetermined number of stable states.

References Cited

UNITED STATES PATENTS

| | | | |
|---|---|---|---|
| 2,913,675 | 11/1959 | Curtis | 332—1 X |
| 3,022,469 | 2/1962 | Bahrs et al. | 332—14 |
| 3,205,448 | 9/1965 | Bahrs et al. | 332—1 X |

ALFRED L. BRODY, Primary Examiner

U.S. Cl. X.R.

307—271; 321—69; 331—113; 332—16